United States Patent
McCabe et al.

(10) Patent No.: US 10,501,686 B2
(45) Date of Patent: Dec. 10, 2019

(54) METHODS OF PREPARING TREATMENT FLUIDS COMPRISING ANHYDROUS AMMONIA FOR USE IN SUBTERRANEAN FORMATION OPERATIONS

(71) Applicant: Halliburton Energy Services, Inc., Houston, TX (US)

(72) Inventors: Michael A. McCabe, Duncan, OK (US); Jim D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 32 days.

(21) Appl. No.: 15/549,125

(22) PCT Filed: Mar. 10, 2015

(86) PCT No.: PCT/US2015/019556
§ 371 (c)(1),
(2) Date: Aug. 4, 2017

(87) PCT Pub. No.: WO2016/144323
PCT Pub. Date: Sep. 15, 2016

(65) Prior Publication Data
US 2018/0030340 A1    Feb. 1, 2018

(51) Int. Cl.
| | | |
|---|---|---|
| *C09K 8/58* | (2006.01) | |
| *C09K 8/84* | (2006.01) | |
| *C09K 8/62* | (2006.01) | |
| *C09K 8/03* | (2006.01) | |
| *C09K 8/528* | (2006.01) | |
| *C09K 8/57* | (2006.01) | |
| *C09K 8/60* | (2006.01) | |
| *C09K 8/72* | (2006.01) | |
| *C09K 8/504* | (2006.01) | |
| *C09K 8/52* | (2006.01) | |
| *C09K 8/536* | (2006.01) | |
| *C09K 8/54* | (2006.01) | |
| *C09K 8/92* | (2006.01) | |
| *C09K 8/94* | (2006.01) | |
| *E21B 21/00* | (2006.01) | |
| *E21B 37/06* | (2006.01) | |
| *E21B 41/02* | (2006.01) | |

(52) U.S. Cl.
CPC ............... *C09K 8/845* (2013.01); *C09K 8/03* (2013.01); *C09K 8/5045* (2013.01); *C09K 8/52* (2013.01); *C09K 8/528* (2013.01); *C09K 8/536* (2013.01); *C09K 8/54* (2013.01); *C09K 8/572* (2013.01); *C09K 8/58* (2013.01); *C09K 8/602* (2013.01); *C09K 8/605* (2013.01); *C09K 8/607* (2013.01); *C09K 8/62* (2013.01); *C09K 8/72* (2013.01); *C09K 8/92* (2013.01); *C09K 8/94* (2013.01); *C09K 2208/10* (2013.01); *C09K 2208/20* (2013.01); *C09K 2208/22* (2013.01); *C09K 2208/26* (2013.01); *C09K 2208/28* (2013.01); *C09K 2208/30* (2013.01); *C09K 2208/32* (2013.01); *E21B 21/003* (2013.01); *E21B 37/06* (2013.01); *E21B 41/02* (2013.01)

(58) Field of Classification Search
CPC ...... C09K 8/845; C09K 2208/22; C09K 8/52; C09K 8/528; C09K 8/536; C09K 8/572; C09K 8/58; C09K 8/72; C09K 8/92; C09K 8/62; C09K 2208/10; C09K 2208/20; C09K 2208/26; C09K 2208/28; C09K 2208/30; C09K 2208/32; C09K 8/03; C09K 8/16; C09K 8/5045; C09K 8/54; C09K 8/594; C09K 8/602; C09K 8/605; C09K 8/607; C09K 8/665; C09K 8/94; C09K 8/02; C09K 8/06; C09K 8/68; C09K 8/86; E21B 43/25; E21B 21/003; E21B 33/13; E21B 37/06; E21B 41/02; E21B 43/04; E21B 43/16; E21B 43/26; E21B 43/267; E21B 43/2405
See application file for complete search history.

(56) References Cited

U.S. PATENT DOCUMENTS

| | | |
|---|---|---|
| 3,148,970 A | 9/1964 | Smith et al. |
| 3,702,635 A | 11/1972 | Farr |
| 3,776,312 A | 12/1973 | Ban et al. |
| 3,900,070 A | 8/1975 | Chatterji et al. |
| 3,930,539 A | 1/1976 | Curtis |

(Continued)

FOREIGN PATENT DOCUMENTS

| | | |
|---|---|---|
| WO | WO-2015/084717 A1 | 6/2015 |
| WO | WO-2016/144322 A1 | 9/2016 |
| WO | WO-2016/144323 A1 | 9/2016 |

OTHER PUBLICATIONS

Cornell et al., "Studies on the Use of Supercritical Ammonia for Ceramic Nitride Synthesis and Fabrication," NASA Technical Memorandum 102570, Apr. 1990, 20 pages.

(Continued)

*Primary Examiner* — Kumar R Bhushan
(74) *Attorney, Agent, or Firm* — McGuireWoods LLP

(57) ABSTRACT

Methods comprising preparing a gelled fluid comprising a base fluid, a first gelling agent, and particulates; introducing the gelled fluid into a process stream, the process stream in fluid communication with a subterranean formation; introducing anhydrous ammonia into the gelled fluid at a downstream location in the process stream, thereby forming a particulate-containing treatment fluid; and introducing the particulate-containing treatment fluid into the subterranean formation from the process stream and through the wellhead.

9 Claims, 1 Drawing Sheet

(56) References Cited

U.S. PATENT DOCUMENTS

| | | |
|---|---|---|
| 3,990,978 A | 11/1976 | Hill |
| 4,007,128 A | 2/1977 | Poklacki |
| 4,104,173 A | 8/1978 | Gay et al. |
| 4,153,649 A | 5/1979 | Griffin, Jr. |
| 4,183,406 A | 1/1980 | Lundberg et al. |
| 4,200,540 A | 4/1980 | Burnham |
| 4,372,386 A | 2/1983 | Rhoades et al. |
| 4,483,957 A | 11/1984 | Lundberg et al. |
| 4,567,947 A | 2/1986 | Mzik |
| 4,579,671 A | 4/1986 | Lundberg et al. |
| 4,615,393 A | 10/1986 | Sedillo et al. |
| 4,634,542 A | 1/1987 | Duvdevani et al. |
| 4,638,542 A | 1/1987 | Akiyama et al. |
| 4,644,060 A | 2/1987 | Chou |
| 4,787,994 A | 11/1988 | Thorne et al. |
| 5,057,233 A | 10/1991 | Huddleston |
| 5,110,485 A | 5/1992 | Huddleston |
| 5,202,035 A | 4/1993 | Huddleston |
| 5,417,287 A | 5/1995 | Smith et al. |
| 5,514,645 A | 5/1996 | McCabe et al. |
| 5,571,315 A | 11/1996 | Smith et al. |
| 5,614,010 A | 3/1997 | Smith et al. |
| 5,713,416 A | 2/1998 | Chatterji et al. |
| 5,799,734 A | 9/1998 | Norman et al. |
| 7,497,261 B2 | 3/2009 | Dyer |
| 7,938,183 B2 | 5/2011 | Hart et al. |
| 8,443,890 B2 | 5/2013 | Hoch et al. |
| 2013/0146288 A1* | 6/2013 | Smith ............... E21B 43/16 166/300 |
| 2014/0060828 A1 | 3/2014 | Nguyen et al. |
| 2014/0083695 A1 | 3/2014 | Nguyen |
| 2014/0144639 A1 | 5/2014 | Nguyen et al. |
| 2014/0148369 A1 | 5/2014 | Tang et al. |
| 2014/0196902 A1 | 7/2014 | Southwick et al. |
| 2015/0152318 A1* | 6/2015 | Travis ............... C09K 8/62 166/280.1 |

OTHER PUBLICATIONS

Pauls et al., "Successful Stimulation of the Olmos Formation Using Oil-Base Fluids and High-Proppant Concentrations," SPE 13817, 1985, 8 pages.

Taibin et al., Experimental Study of Separation of Ammonia Synthesis Vent Gas by Hydrate Formation, Pet. Sci. (2009) 6:188-193.

International Search Report and Written Opinion from PCT/US2015/019556, dated Nov. 18, 2015.

* cited by examiner

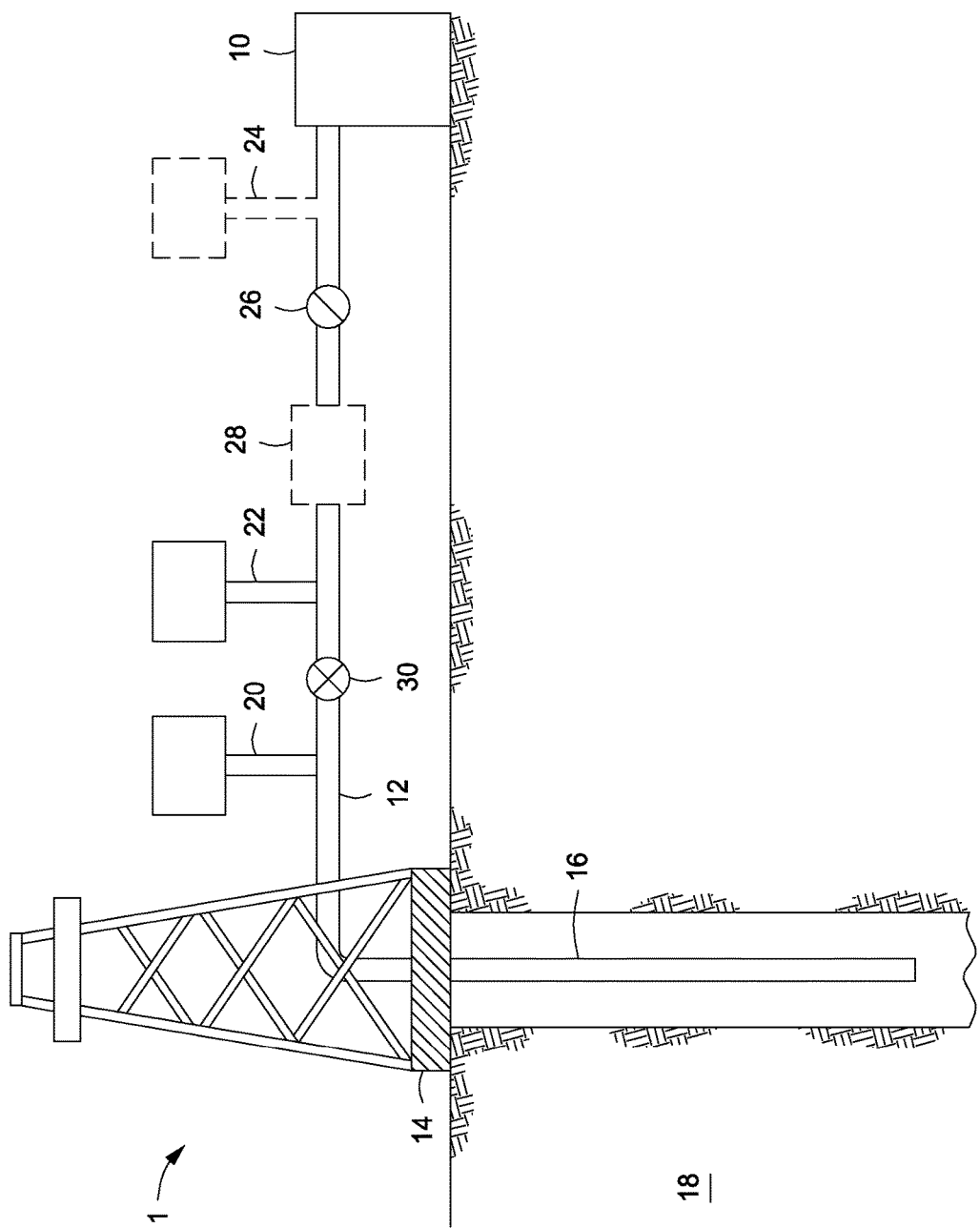

METHODS OF PREPARING TREATMENT FLUIDS COMPRISING ANHYDROUS AMMONIA FOR USE IN SUBTERRANEAN FORMATION OPERATIONS

BACKGROUND

The embodiments herein relate generally to subterranean formation operations and, more particularly, to treatment fluids comprising anhydrous ammonia for use in subterranean formation operations.

Subterranean formations (e.g., hydrocarbon producing wells) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids are then deposited in the fractures. These particulate solids ("proppant particulates" or "proppant") serve to prevent the fractures from fully closing once the hydraulic pressure is removed by forming a proppant pack. As used herein, the term "proppant pack" refers to a collection of proppant particulates in a fracture. By keeping the fracture from fully closing, the proppant particulates aid in forming conductive paths through which fluids may flow.

Subterranean formations may additionally be stimulated by acid treatments ("acidizing"). Acidizing involves introducing an acidic fluid into the formation to dissolve acid-soluble materials that may clog or constrict formation channels, such as the conductive paths formed between proppant particulates in a proppant pack. Acidic fluids may remove or reduce gas hydrates, among other materials, thus allowing produced fluids from the formation to flow more readily or easily through the formation and into a wellbore for production. Acidizing may also facilitate the flow of injected treatment fluids from the wellbore into the formation, when it is desired. In some instances, hydraulic fracturing may be performed using an acidic treatment fluid ("acid fracturing").

Stimulation operations, and other subterranean formation operations, are designed to maximize production of fluids therefrom. When production is underway, up-front costs can be recouped provided that operating costs remain low enough for the sale of oil and/or gas to be profitable. Additionally, midstream and downstream processing costs of produced hydrocarbons (i.e., oil and natural gas, which may collectively be referred to herein simply as "oil") may affect the profitability of the produced hydrocarbons. Gas hydrate production in cold climates, in deepwater environments, or at any point during hydrocarbon production may interfere with this profitability. Gas hydrates are a form of a unique class of chemical compounds known as clathrates. Gas hydrates are characterized by a rigid, open network of bonded host molecules that enclose, without direct chemical bonding, appropriately sized guest molecules of another substance. For example, in the case of gas hydrates a crystalline water molecule acts as the host molecule, which forms a "cage" around a smaller hydrocarbon molecule (e.g., methane), thereby yielding ice-like crystals of gas and water. These gas hydrates tend to adhere to each other, resulting in large ice-like crystals formed on the surface of hydrocarbon conduits that act as blockades ("gas hydrate plugs").

BRIEF DESCRIPTION OF THE DRAWINGS

The following figure is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering various fluids of the embodiments described herein to a downhole location.

DETAILED DESCRIPTION

The embodiments herein relate generally to subterranean formation operations and, more particularly, to treatment fluids comprising anhydrous ammonia for use in subterranean formation operations.

Current subterranean formation operations often employ large amounts of aqueous-based treatment fluids, which may tax local resources when water is a scarce resource, or when water desalination or other treatment operations are too costly or otherwise unfeasible. For example, arid regions or regions that do not have sea access may have scarce water resources. Accordingly, subterranean formation operations in such regions (e.g., stimulation operations, remedial operations, enhanced oil recovery ("EOR") operations, and the like), must compete with other stakeholders for water use, such as agriculture, energy generation, human consumption, and the like. The concern for water scarcity in subterranean formation operations is expected to rise as such operations are increasing in the continental United States and other arid regions, such as Western China and Australia. Accordingly, some embodiments herein relate to subterranean formation operation treatment fluids having little or no water, which may be used in any region, without concern for water scarcity. Nevertheless, the treatment fluids, as described herein, may additionally be prepared using water or other aqueous fluids, without departing from the scope of the present disclosure, and without hindering the benefits described herein.

In some embodiments, the methods and compositions described herein may be with reference to particular subterranean formation operations (e.g., hydraulic fracturing operations, gas hydrate removal operations, acidizing operations, and the like). However, the anhydrous ammonia treatment fluids described herein may be used in any subterranean formation operation that may benefit their advantages described herein, including their ability to be used in treatment fluids with little or no water component. Such subterranean formation operations may include, but are not limited to, a drilling operation, a stimulation operation, an acidizing operation, an acid-fracturing operation, a sand control operation, a fracturing operation, a frac-packing operation, a gravel-packing operation, a production operation, a remedial operation, a gas hydrate removal operation, an enhanced oil recovery operation, an injection operation, a pipeline operation (e.g., transporting hydrocarbon fluids through a pipeline), a remedial operation, a formation damage reduction operation, a cementing operation, and the like, and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about."

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" may refer to a +/−5% numerical range.

Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

It should further be noted that, as used herein, the term "substantially" means largely, but not necessarily wholly.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a treatment fluid comprising anhydrous ammonia ("AA") alone or in a base fluid for introduction in a subterranean formation to perform subterranean formation operations. That is, the AA may be sole component of the treatment fluid, or may be in a solution, mixture, or slurry, without departing from the scope of the present disclosure. The AA may also be a foam, or a meso-solid, such as a surfactant-ammonia blend. In some embodiments, the AA in an AA treatment fluid may be in a liquid phase, a gaseous phase, a supercritical phase, and any combination thereof, without departing from the scope of the present disclosure, and may depend on a number of factors such as pressure, temperature, percent concentration, and the like. As used herein, the term "AA treatment fluid" will be used to describe any type or form of treatment fluid comprising AA.

In some embodiments, the AA treatment fluids described herein may be used as an alternative to water or other base fluids for both fracturing operations, as well as secondary treatment operations of the formation. The AA, in some embodiments, may be readily generated by the Haber process, which generates the AA by a reaction of nitrogen gas and hydrogen gas. In some instances, natural gas may be used as the source for the hydrogen gas and air may be used as the source for the nitrogen gas, both readily available in arid regions, as well as other regions. The ease of generation of AA through the Haber process, for example, may permit such generation to occur at a well site or location geographically close thereto. Such generation may additionally be achieved at another location off site, without regard to the well site location, without departing from the scope of the present disclosure. Moreover, the generation of AA may be relatively low in cost, and may be particularly beneficial where the cost of water exceeds the cost of generating the AA or where local legislation prohibits water use (or large amounts of water use).

The use of AA as a treatment fluid or as a bulk amount of a treatment fluid may have a number of beneficial uses in a subterranean formation operation, each of which may improve production of a formation and extend the lifetime of a formation. As used herein, the term "bulk amount of AA," and grammatical variants thereof, refers to the AA being present in a treatment fluid in the greatest weight percent of each individual fluid portion thereof, which may be in a liquid phase and/or a gaseous phase, but not less than about 10% of the total weight percent of the fluid portion of the treatment fluid. In other instances, the AA being present in a treatment fluid in an amount not less than about 20% of the total weight percent of the fluid portion of the treatment fluid. In other instances, the AA being present in a treatment fluid in an amount not less than about 33% of the total weight percent of the fluid portion of the treatment fluid. In some instances, the AA is 100% of the fluid portion of the treatment fluid. By way of example, for a liquid-only fluid having 5 individual fluid components each at a known weight percent of the total fluid, it may be as follows: B=25% C=1% D=15%, E=10%, AA=49%. Or, for a three-component fluid the percentages may be B=33%, C=33%, AA=34%. In any event, the percent of AA must be the greatest weight percentage. For an example wherein the fluid has both a gas phase and a liquid phase, the AA again must be in the greatest weight percentage overall—considering the totals of the gaseous and liquid phases together.

AA may be particularly effective at at least partially inhibiting gas hydrate formation in a subterranean formation, such as after a stimulation operation (e.g., a fracturing operation), or in a pipeline during transport of produced hydrocarbon fluids. That is, the AA treatment fluid may be introduced into a formation or pipeline to at least partially inhibit gas hydrate formation (e.g., by inhibiting formation or by reducing the presence of already formed gas hydrates). In other embodiments, the AA treatment fluid may be used to pre-treat a pipeline conduit prior to flowing a hydrocarbon through the pre-treated pipeline conduit to at least partially inhibit the formation of a gas hydrate therein. As used herein, the term "at least partially inhibiting the formation of a gas hydrate" (or "at least partially inhibiting gas hydrate formation") refers to a reduction of gas hydrate formation compared to such formation without treatment with an AA treatment fluid sufficient to maintain a pipeline or subterranean formation (e.g., a wellbore) operable.

Gas hydrates may traditionally be prevented or treated after formation with anti-agglomerate surfactants, which operate under certain conditions. Such traditional operations may be costly and, particularly when determining the optimal type and concentration of surfactant to use, and typically require secondary operations to be performed in addition to the subterranean formation operation. The AA treatment fluids described herein, however, may be used synergistically to perform a given subterranean formation operation (e.g., fracturing) while simultaneously controlling gas hydrate formation. They may also be used to flow through a pipeline prior to introducing a produced hydrocarbon fluid to prevent or reduce gas hydrate formation.

The AA may form a gas at reservoir conditions, which may function similar to highly diluted methane and result in a significant decrease in gas hydrate formation tendency. The AA may cause this decrease by increasing the pressure needed for gas hydrate formation to occur. Moreover, the amount of AA required to inhibit gas hydrate formation is relatively low, which may be as low as 0.004% by weight of the AA treatment fluid as a whole, and any greater amount, without departing from the scope of the present disclosure. Additionally, by merely decreasing the temperature (e.g., refrigeration) during flowback from a formation or at a point just prior to the end of a pipeline, the AA may be easily captured for reuse.

Indeed, the AA in an AA treatment fluids described herein may be readily recovered after performing a subterranean formation operation and recycled as it is a gas at standard temperature and pressure ("STP"), including recycling at the well head itself. As used herein, the term "STP" refers to a temperature of 273 K (0° C.) and 1 standard atmospheric pressure (101.325 kilopascal). Accordingly, the AA can be easily stripped from a produced fluid stream (e.g., by bringing the mixture to STP conditions so the gas can boil off and be captured) and re-used in future subterranean formation operations or in other operations that are not related to the oil and gas industry. Separation at STP may be performed by temperature distillation, gas compression, and the like. The AA may be captured by any such method for later re-use. As an example, the recycled AA may be sold as another revenue source for use in other industries, or stored for later use. Recovery of AA may be dependent upon a number of factors including, but not limited to, the type of subterranean formation, operation being performed therein, and the like.

Another advantage of the AA treatment fluids described herein is that the AA may be used to at least partially ammonolyze heavy aromatic compounds which may deposit onto or into pore throats of a subterranean formation and decrease the productivity of the formation. As used herein, the term "ammonolyze" and grammatical variants thereof (e.g., ammonolysis) refers to a reaction with ammonia in which a bond is broken. Ammonolysis may be used herein to encompass both solubility (i.e., the process of incorporating a solubilizate into or onto micelles, such as solubilizing salt in water) and solvation (i.e., the interaction of a solute with a solvent, resulting in a reversible chemical combination (e.g., a dissolved molecule, ion, etc.). Thus, the AA treatment fluid may be introduced into a subterranean formation comprising such heavy aromatic compounds where the AA at least partially ammonolyzes the heavy aromatic compounds. As used herein, the term "at least partially ammonolyzes" (or "at least partially ammonolyzing") refers to greater than about 10% ammonolysis.

Such heavy aromatic compounds may include, but are not limited to, kerogen, bitumen, asphaltenes, paraffins, and the like, and any combination thereof. For example, the AA may be used to solvate an electron taken from a Group I metal, for example. The solvated electron may induce a charge on a molecule (e.g., a nanotube) thus disrupting the Van der Waals interactions of those molecules, allowing solvation. In doing so, pore pathways within the formation may be opened by developing wormholes in the source rock where the heavy aromatic compounds once were by solvation with the AA. As used herein, the term "wormhole" refers to voids created within a subterranean formation source rock. These wormholes allow a pathway for hydrocarbons to flow from the formation and into a wellbore, which is not achieved using traditional treatment fluids for subterranean formation operations (e.g., hydraulic fracturing).

As discussed herein, the AA treatment fluids of the present disclosure may be used in a variety of subterranean formation operations. For example, in some embodiments, the AA treatment fluids may be used in a hydraulic fracturing treatment where the AA treatment fluid is introduced into a subterranean formation operation at a rate and pressure sufficient to create or enhance at least one fracture therein. When used in hydraulic fracturing operations, or in other operations after fracturing, the AA in the AA treatment fluid may also be used to etch microfractures in the formation rock. As used herein, the term "microfracture" refers to a discontinuity in a portion of a subterranean formation (e.g., a fracture) such that an etch is created in the formation. For example, where the formation rock is shale, the AA molecule, particularly when in the liquid phase, induced microfractures through shale embrittlement due to the unique polarization of the AA. The formation may also be any other formation type having AA-soluble materials that may be removed using the AA treatment fluids described herein to increase the surface area (e.g., wormholes) in the formation. Such microfractures may similarly be formed by the solvation and/or emulsification of heavy aromatic compounds, as previously described. These microfractures may improve a formation's production of desired fluids (e.g., hydrocarbons).

As well as fracturing operations, other subterranean operations related to production, clean-up, and EOR may be enhanced by using the AA treatment fluids described herein. In particular, temperature increases due to liberation of thermal energy may occur within a subterranean formation upon contact of the AA in the AA treatment fluid with connate water, where the AA and the connate water react to form ammonia hydroxide. As used herein, the term "connate water" refers to water trapped in the interstices of a subterranean formation (e.g., sedimentary rock) at the time of its deposition. The increase in temperature upon such contact may decrease the viscosity of hydrocarbons (e.g., heavy crude) within the formation, thus inhibiting the surface tension interactions of an oil-wet surface of the formation and allowing such hydrocarbons to flow more easily from the pore spaces of the formation and into a wellbore. Accordingly, for example, traditional heat EOR and the associated high costs therewith may be avoided by inducing a migrating heat front using the AA treatment fluids described herein. This migrating heat front may be used in a targeted fashion (e.g., at a particular location in a formation), and may be particularly useful in multilateral well systems.

In some embodiments, the AA in any of the AA treatment fluids described herein may be a supercritical fluid. As used herein, the term "supercritical fluid" refers to a substance (e.g., AA) at a temperature and pressure above its critical point, where distinct liquid and gas phases do not exist. Such supercritical fluids may be able to effuse through solids like a gas, and dissolve materials like a liquid. In some instances, the use of supercritical AA in the AA treatment fluids may be used in lieu of traditional acid treatments, which typically employ an acid (e.g., hydrofluoric acid, hydrochloric acid, acetic acid, and the like, and combinations thereof) to dissolve formation damage (e.g., silicates or carbonates) to increase permeability of the formation. The use of supercritical AA may achieve the desired dissolution and increased permeability without the aggressive and corrosive nature of traditional acids that may pose a risk to the environment and/or human health. That is, the AA, and at supercritical conditions, is simple, easy to use, and environmentally friendly. As used herein, the term "formation damage" refers to a reduction in the permeability of a formation (e.g., in the near wellbore region), such as by deposition of a filtercake, natural or intentional, on the face of the formation.

The use of supercritical AA treatment fluids may further permit single use fluids for certain subterranean formation operations, including any of those previously discussed (e.g., fracturing operations, production operations, remedial operations, EOR operations, pipeline operations, and the like). For example, the supercritical AA treatment fluids may be used as a fracturing fluid that simultaneously performs as an acidizing fluid, without having to use a two-step fluid treatment, as is traditionally done. Such is true with both primary and remedial subterranean formation operations. The synergistic operation of the supercritical AA treatment fluids is thus, not only environmentally friendly, but also economic in terms of time and cost.

Supercritical fluids, such as supercritical AA for use in the AA treatment fluids described herein, may exhibit several advantages such as increased solubilities, near zero surface tension, low viscosity and high diffusivity resulting in high mass transfer, and the like. Each of these advantages are extremely valuable for dissolution of otherwise difficult to dissolve substances in a formation typically targeted by acid treatments.

Supercritical AA has the benefit of being able to solubilize heavy insoluble compounds, such as silicon dioxide ($SiO_2$), with enhanced solubilization properties (e.g., supercritical water has been shown to be enhanced when combined with a base). AA achieves its supercritical status at a temperature greater than 132.4° C. (270.3° F.) and pressure greater than 112.8 bar (1636 pounds per square inch). Such conditions are typical of many subterranean formations, thus naturally facilitating the use of AA in an AA treatment fluid at its supercritical point.

As an example, calcareous formations may comprise various alkali or alkali-earth carbonates, such as, for example, potassium carbonate, sodium carbonate, calcium carbonate, magnesium carbonate, and the like and any combination thereof. Such calcareous formations may additionally comprise other transition metal carbonates, such as, for example, iron carbonate, copper carbonate, zinc carbonate, and the like, and any combination thereof. These carbonates may react with supercritical AA in an AA treatment fluid and form either corresponding ammonium salts (and other salt formations, such as nitrate salts) or other ammonia adducts or complexes. Such ammonia adducts or complexes may be referred to as ammonates or amine complexes, which may be more analogous to commonly known hydrates (e.g., $CaCl_2 \times 8NH_3$, $CuSO_4 \times 4NH_3$, and the like). Both of these ammonium salts and ammonium adducts or complexes are very soluble in AA, particularly supercritical AA, making the AA treatment fluid at supercritical conditions particularly effective as an alternative to an acid treatment. Accordingly, subterranean formations comprising such alkali carbonates, alkali-earth carbonates, transition metal carbonates, and the like, and combinations thereof, may have an AA treatment fluid introduced therein where the subterranean formation has a temperature and pressure that meets or exceeds the supercritical point for the AA, and wherein the supercritical AA at least partially solubilizes the carbonates.

As further example as to mechanisms of the supercritical AA's ability to dissolve minerals in formations that may inhibit produced hydrocarbon flow, Mechanism I and II are provided below with reference to calcareous formations. Mechanism I demonstrates the mechanism by which the supercritical AA generates ammonium salts from minerals present within the formation itself. Such ammonium salts are readily dissolvable in supercritical AA and thus can be easily removed from a formation zone of interest.

$$CaCO_3 + 2NH_3 + 2H_2O \rightarrow (NH_4)_2 \cdot CO_3 + Ca(OH)_2 \quad \text{Mechanism I}$$

Mechanism II demonstrates the mechanism by which the supercritical AA coordinates metals found in the minerals present within the formation itself into a coordination sphere, forming the ammonia adducts or complexes described above, such as ammonates. Such ammonia adducts or complexes are readily dissolvable in supercritical AA and thus can easily be removed from a formation zone of interest.

$$CaCO_3 \cdot xH_2O + nNH_3 \rightarrow CaCO_3 \cdot nNH_3 + xH_2O \quad \text{Mechanism II}$$

where x is an integer between 1 and 6, and n is an integer between 1 and 6.

The ammonium salts (and other salts such as nitrate salts) and the ammonium adducts or complexes are generally environmentally friendly or beneficial to the environment (e.g., beneficial for soil), making the use of supercritical AA particularly valuable when compared to corrosive acid treatments traditionally used. Indeed, AA is used as a fertilizer for crop growth, and as compared to acid treatments, for example, it does not possess the corrosiveness of such fluids.

Additionally, supercritical AA used in the AA treatment fluids described herein may reduce scale formation on equipment (e.g., pumping equipment, and the like) because it has the ability to coordinate (i.e., form coordination spheres) with cations present within various treatment fluids or formation fluids (e.g., water), thus generating soluble compounds that prevent or reduce the precipitation of scale formation.

In some embodiments, the AA treatment fluids of the present disclosure may further comprise an oilfield additive. Such oilfield additives may include, but are not limited to, a gelling agent, a salt, a weighting agent, an inert solid, a fluid loss control agent, an emulsifier, a dispersion aid, a corrosion inhibitor, an emulsion thinner, an emulsion thickener, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, a defoaming agent, and any combination thereof.

In some embodiments, the AA treatment fluid may be in a liquid phase or a supercritical phase and may be a gelled AA treatment fluid, wherein the AA treatment fluid comprises a gelling agent, for use in any of the subterranean operations described herein (e.g., drilling operations, fracturing operations, and the like, and combinations thereof). In some embodiments, the gelling agent in the AA treatment fluid may be a colloidal clay. The colloidal clays for use in the AA treatment fluids may increase viscosity, provide friction reduction, and the like. As used herein, the term "colloidal clay" refers to a clay that forms a colloidal dispersion when mixed into a treatment fluid. As used herein, the term "colloidal dispersion" refers to a substance in which microscopically dispersed insoluble particles are suspended throughout another substance.

In aqueous applications, the colloidal dispersion formed by the colloidal clay may be in the shape of a "house of cards" or "sheet" structure, owed to the presence of silicate tetrahedrons in the clay, in which a central silicon atom is surrounded by four oxygen atoms at the corners of the tetrahedron. The sheets are formed by the sharing of three of the oxygen atoms of each tetrahedron with other tetrahedrons without any two tetrahedrons having more than one oxygen atom in common (e.g., each tetrahedron is linked to three other, distinct tetrahedrons). The remaining unshared oxygen atom is capable of interaction or bonding with other atoms or molecules. The sheets formed from the colloidal clay may be characterized as having a strong negative charge on the face of the sheet and a weak positive charge on the rim. As a result of these charges, the sheets may exhibit face-edge aggregation, leading to the relatively open, macroporous sheet structure.

However, not all colloidal clays are water dispersible due to small ionic interaction and interchanges within the clay. Accordingly, for use in the AA treatment fluids described herein, these small interactions may be broken by contact with the AA, resulting in a uniformly distributed colloid AA-clay gelled treatment fluid. The AA may inhibit the formation of the house-of-cards structure by the colloidal clays due to the polarity of the ammonia disrupting the charge bonding of the colloidal clays and inhibiting the house-of-cards structure, which may be preferred to enhance production by having uniformly distributed clay. Such an AA gelled treatment fluid may be used in a variety of subterranean formation operations, including fracturing operations (e.g., for proppant suspension and transport), and the like.

In some embodiments, the colloidal clay gelling agent for use in the AA treatment fluids described herein may include, but are not limited to, a phyllosilicate clay, a tectosillicate clay, and any combination thereof. Such colloidal clays may be anhydrous or hydrated, and naturally occurring or synthetic. In some instances, the colloidal clays may have variable amounts of cations, such as sodium cations, iron cations, magnesium cations, and the like, and any combination thereof.

Suitable phyllosilicate clays for use in the AA treatment fluids described herein may include, but are not limited to, an aliettite, a beidellite, a ferrosaponite, a hectorite, a laponite, a nontronite, a pimelite, a saliotite, a saponite, a sauconite, a stevensite, a swinefordite, a volkonskoite, a yakhontovite, a zincsilite, an amesite, an antigorite, a berthierine, a brindleyite, a caryopilite, a chrysotile, a clinochrysotile, a cronstedtite, a dickite, a fraipontite, a greenalite, a halloysite, a kaolinite, a kellyite, a lizardite, a manandonite, a nacrite, a nepouite, an odinite, an orthochrysotile, a parachrysotile, a pecoraite, a ferripyropyllite, a minnesotaite, a pyrophyllite, a talc, a willemseite, an aluminoceladonite, an anadite, an aspidolite, a biotite, a bityite, a boromuscovite, a celadonite, a chernykhite, a chromceladonite, a clintonite, an ephesite, a ferro-aluminoceladonite, a ferroceladonite, a ferrokinoshitalite, a ganterite, a glauconite, a hendricksite, an illite, a kinoshitalite, a lepidolite, a luanshiweiite, a margarite, a masutomilite, a montdorite, a muscovite, a nanpingite, a norrishite, an oxykinoshitalite, an oxyphlogopite, a phengite, a phlogopite, a polylithionite, a preiswerkite, a roscoelite, a shirokshinite, a siderophyllite, a sokolovaite, a suhailite, a tainiolite, a tetraferriphlogopite, a tovelite, a trilithionite, a voloshinite, a yangzhumingite, a zinnwaldite, a baileychlore, a borocookeite, a chamosite, a clinochlore, a cookeite, a corundophilite, a donbassite, a franklinfurnaceite, a nimite, an orthochamosite, a pennantite, a sudoite, and the like, and any combinations thereof.

Suitable tectosilicate clays for use in the AA treatment fluids described herein may include, but are not limited to, a quartz, a tridymite, a cristobalite, a coesite, a feldspar, an alkali-feldspar, a microcline, an orthoclase, an anorthoclase, a sanidine, an albite, a plagioclase feldspar, an oligoclase, an andesine, a labradorite, a bytownite, an anorthite, a felsparthoid, a norsean, a cancrinite, a leucite, a nepheline, a sodalite, a hauyne, a lazurite, a petalite, a scapolite, a marialite, a meionite, an analcime, a zeolite, a chabazite, a heulandite, a stilbite, a scolecite, a mordenite, an aluminosilicate, an andalusite, a kyanite, a sillimanite, a calcium aluminosilicate, a sodium aluminosilicate, a jadeite, and the like, and any combination thereof.

In other embodiments, the gelling agent may be a naturally-occurring gelling agent, a synthetic gelling agent, and any combination thereof. Suitable gelling agents may include, but are not limited to, polysaccharides, biopolymers, and/or derivatives thereof that contain one or more of the monosaccharide units: galactose, mannose, glucoside, glucose, xylose, arabinose, fructose, glucuronic acid, and/or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and the like, and any combination thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and the like, and any combination thereof. In certain embodiments, the gelling agent may comprise an acrylamide/2-(methacryloyloxy)ethyltrimethylammonium methyl sulfate copolymer, an acrylamide/2-

(methacryloyloxy)ethyltrimethylammonium chloride copolymer, a derivatized cellulose that comprises cellulose grafted with an allyl or a vinyl monomer, and the like, and any combination thereof.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent (e.g., colloidal clay) may be present in the AA treatment fluids described herein in an amount sufficient to provide the desired viscosity and/or friction reducing properties. In some embodiments, the gelling agents may be present in the AA treatment fluids in an amount in the range of from a lower limit of about 0.01%, 0.05%, 0.1%, 0.5%, 1%, 1.5%, 2%, 2.5%, 3%, 3.5%, 4%, and 4.5% to an upper limit of about 10%, 9.5%, 9%, 8.5%, 8%, 7.5%, 7%, 6.5%, 6%, 5.5%, 5%, and 4.5% by weight of the AA treatment fluid, encompassing any value and subset therebetween.

In some embodiments, the present disclosure provides a method of preparing and delivering the AA treatment fluids to a downhole location. Referring now to FIG. 1, illustrated is a delivery system and method for delivering a treatment fluid comprising AA to a downhole location, according to one or more embodiments described herein. As illustrated, FIG. 1 generally depicts a land-based system; however, it is to be recognized that like systems may be operated in subsea locations, without departing from the scope of the present disclosure.

The delivery system described herein may be in various forms, including batch form or continuous form. In some embodiments, a well system 1 may generally include a storage tank 10, in which an initial portion of the treatment fluid described herein may be formulated. The storage tank 10 may be a tanker or silo, and may additionally be equipped as a mixer, without departing from the scope of the present disclosure. The treatment fluid may then be conveyed via a process stream 12 in fluid communication with the storage tank 10 to a wellhead 14, wherein the process stream 12 is in fluid communication with the wellhead 10. The process stream 12 may carry the treatment fluid and may be fluidly connected to various inputs 20,22, 24 (in phantom) for including various fluids and/or oilfield additives into the treatment fluid, as described in detail below. The treatment fluid may then be conveyed into a subterranean formation 18 by means of a tubular 16 in fluid communication with the wellhead 14 and subterranean formation 18.

A pump 26 may be configured to raise the pressure of the portion of the treatment fluid in the process stream 12 to a desired degree before its introduction into the tubular 16. Generally, the pump 26 may be a low-pressure pump that operates at a pressure of about 1000 psi or less (e.g., atmospheric pressure). Depending on the nature of the delivery system (e.g., batch or continuous), a blender or mixer 28 (in phantom) may also be included in fluid communication with the process stream 12 upstream of the storage tank 10. As used herein, the term "upstream" with reference to the process stream 12 refers to a location toward the storage tank 10 and the term "downstream" with reference to the process stream 12 refers to a location toward the wellhead 14. Just prior to introducing the treatment fluid into the tubular 16 through the wellhead 14, a portion of the treatment fluid flows through the process stream 12 and encounters a high-pressure pump 30, that elevates the pressure to a pressure greater than about 1000 psi. In some embodiments, the low pressure pump 26 may "step up" the pressure of the treatment fluid before it reaches the high pressure pump 30. The high pressure pump permits AA to be added to the process stream 12 downstream thereto and into the treatment fluid for introduction into the subterranean formation 18 through the wellhead 14 and tubular 16.

It should be noted that while FIG. 1 is merely an illustrative embodiment of the present disclosure and the order and number of the pumps 26,30; inlets 20,22,24; and blender (s) 28 may vary depending on the nature of the particular embodiment employed. That is, the processing stream 12 may have at any location therealong any number and order of pumps, inlets, and blends, without departing from the scope of the present disclosure. Moreover, the process stream 12 may further include additional components, without departing from the scope of the present disclosure. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to the wellhead 14 and exit subterranean formation 18. In some embodiments, the treatment fluid that has flowed back to wellhead 14 may subsequently be recovered and recirculated to subterranean formation 18, or recycled as described above.

In one embodiment, the present disclosure provides a batch method of delivering an AA treatment fluid to a downhole location comprising preparing a gelled fluid comprising a base fluid, a first gelling agent, and particulates. The gelled fluid may be formulated or otherwise housed in the storage tank 10. From the storage tank 10, the gelled fluid may be introduced into the process stream 12 by use of the low-pressure pump 26. As previously discussed, the process stream 12 is in fluid communication with the wellhead 14 and the wellhead 14 is in fluid communication with the subterranean formation 18 via the tubular 16. The gelled fluid passes the high-pressure pump 30 downstream of the storage tank 10 and thereafter AA is introduced into the gelled fluid at a location downstream of the storage tank 10 and downstream of the high-pressure pump 30, thereby forming a particulate-containing treatment fluid comprising AA. The particular-containing treatment fluid comprising AA is then introduced into the subterranean formation 18 via the tubular 16 through the wellhead 14. In some embodiments, oilfield additives, including those discussed herein, may be included in the gelled fluid in the storage tank 10 prior to entering the process stream 12 or may be included in the process stream upstream of the high-pressure pump 30, such as through inlet 22, 24 (in phantom) and, when desired, one or more blenders 28 (in phantom) may be included to mix the components in the process stream 12 at any location downstream of the storage tank 10 and, in most instances, upstream of the high-pressure pump 30.

In other embodiments, the present disclosure provides a continuous method of delivering an AA treatment fluid to a downhole location comprising preparing a gelled fluid comprising a first base fluid and a first gelling agent. The gelled fluid may be formulated or otherwise housed in the storage tank 10. From the storage tank 10, the gelled fluid may be introduced into the process stream 12 by use of the low-pressure pump 26. Thereafter, particulates may be introduced into the process stream at one or more of inlet 22 or 24 upstream of the storage tank 10, thereby forming a particulate slurry. In some embodiments, the particulates may be introduced into the process stream 12 in a gelled particulate slurry comprising a second base fluid and a second gelling agent. The particular slurry passes the high-pressure pump 30 downstream of the storage tank 10 and thereafter AA is introduced into the particular slurry, thereby forming a particulate-containing treatment fluid comprising AA. The particulate-containing treatment fluid comprising AA is then introduced into the subterranean formation 18 via the tubular 16 through the wellhead 14. As discussed above, oilfield additives may be included in the initial gelled fluid or may be introduced into the process stream 12 at any location, such as through inlet 22, 24 (in phantom) and, when desired, one or more blenders 28 (in phantom) may be included at any location along the process stream 12.

In other embodiments, the first gelling agent may be formulated or housed in the storage tank 10 and the base fluid and particulates may be introduced into the process stream 12 together or separately through one or more of inlet 20,22,24, without departing from the scope of the present disclosure. And if a mixer 28 is included in the process stream 12, such inlets may be located either upstream or downstream of the mixer 28, without departing from the scope of the present disclosure.

In some embodiments, the introduction of the particulates, the base fluid, or any oilfield additive in the process stream 12 may occur simultaneously in time with the introduction of the AA into the process stream 12 or sequentially in time, without departing from the scope of the present disclosure. That is, although the location of such introduction is different with reference to the process stream 12, it may be simultaneous or sequential in time at those different locations.

The base fluid comprising a first gelling agent, particulates, and/or one or more oilfield additives at any location in the process stream 12 prior to the addition of the AA may be used as a thick gel that carries those particulates and/or one or more oilfield additives in a pumpable form. However, addition of the AA serves to dilute the gel to a form readily useable (and pumpable) at a downhole location for use in a subterranean formation operation. That is, the gel will carry desired particulates and/or additives throughout the process stream 12 and various equipment attached thereto as required for a particular operation, which is then mixed with the AA, where the AA is safely contained in a pressurized system and used to dilute the gel just prior to introduction of the particulate-containing treatment fluid comprising AA into the subterranean formation 18. The particulate-containing treatment fluid comprising AA may be introduced into the subterranean formation 18 in the form of an emulsion (liquid phase AA), a comingled fluid, a miscible fluid, or a foamed fluid. With reference to the foamed fluid, depending on the application, the AA may be in the gas phase of the liquid/solid phase of the foam. For example, a $CO_2/NH_3$ foam may be generated.

The treatment fluids for use in the embodiments described herein may comprise a bulk amount of AA. As described above, the term "bulk amount of AA" refers to the AA being present in the treatment fluids described herein in the greatest weight percent of each individual fluid portion thereof, which may be in a liquid phase and/or a gaseous phase, but not less than about 10% of the total weight percent of the fluid portion of the treatment fluid. Accordingly, the bulk amount of AA may be present in a weight percent of greater than about 10%, 20%, 30%, 40%, 50%, 60%, 70%, 80%, and 90%, encompassing any value and subset therebetween. Moreover, in some embodiments, the AA itself may form the entirety of the AA treatment fluids described herein.

In some embodiments, the treatment fluids described herein may comprise AA and a base fluid. The base fluid may include, but may not be limited to, an aqueous base fluid, an oil base fluid, a solvent base fluid, a viscoelastic base fluid, a hydrocolloid base fluid, and the like, and any combination thereof. The base fluids may be any phase form including liquid phase or gaseous phase (e.g., steam). In some embodiments, without limitation, the treatment fluids comprising the AA described herein may consist essentially of a substantially non-aqueous liquid portion thereof. As used herein, the term "substantially non-aqueous liquid portion" refers to the liquid portion having no more than about 1% by weight thereof being aqueous. Such substantially non-aqueous liquid portions may include, but are not limited to, the oil base fluids, the viscoelastic base fluids, and/or the hydrocolloid base fluids described herein, for example.

Suitable aqueous base fluids may include, but are not limited to, fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the treatment fluids of the embodiments of the present disclosure. For example, the water may be recovered water (i.e., water used as part of a subterranean formation operation), reclaimed water (i.e., wastewater (sewage) that has been treated to remove certain impurities and/or solids), and the like.

Suitable oil base fluids may include, but are not limited to, alkanes, olefins, aromatic organic compounds, cyclic alkanes, paraffins, diesel fluids, mineral oils, desulfurized hydrogenated kerosenes, and the like, and any combination thereof. Suitable solvent base fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, and the like, and any combination thereof.

Suitable viscoelastic base fluids may include, but are not limited to, methyl ester sulfonates, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), and the like, any derivatives thereof, and any combination thereof. Viscoelastic base fluids may be described as having a hydrophobic tail group that is non-hydrogen bond forming with the hydrophilic head group being hydrogen bonding. Accordingly, AA may be capable of forming a hydrogen bond to form micelles and rods with the viscoelastic base fluid, and solvating the viscoelastic base fluid, thereby being capable of, for example, obtaining sufficient viscosity to carry particulates (e.g., proppant).

Hydrocolloid base fluids may comprise a substance that can viscosify or thicken the treatment fluids of the present disclosure. In some instances, the hydrocolloid base fluids may comprise only the substance, described below, or, in other embodiments, the hydrocolloid base fluids may include the substance in any one of the other base fluids described for use in the embodiments herein. Accordingly, the hydrocolloid base fluid may not be in the form a fluid phase until the bulk amount of AA is included to form the treatment fluid, without departing from the scope of the present disclosure.

Suitable hydrocolloid base fluids may include, but are not limited to, silicon, acrylamide-based polymers (e.g., polyacrylamide), polymethylate-based polymers, and derivatized polysaccharides, where the polymers or polysaccharides thicken a treatment fluid, as described herein. For example, the derivitization of the derivatized polysaccharides may allow the polysaccharides to thicken a treatment fluid, as described herein. Suitable polysaccharides for forming the hydrocolloid base fluids may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), and the like, and any combination thereof.

The gelling agent (first, second, or any additional gelling agents) for use in the various fluids described herein may be any gelling agent previously described herein. In some instances the gelling agent may be included in the gelled fluid and particulate slurry in an amount different than that provided above with reference to the AA treatment fluids because the gelled fluid and the particulate slurry, as discussed above, may be particularly concentrated to allow the AA thereafter dilute the base fluid included therein and form an operating particulate-containing treatment fluid. That is, the final particulate-containing treatment fluid described above may have the gelling agent present therein in an amount described above with reference to the AA treatment fluid after it has been diluted with the AA.

The amount of gelling agent present in the gelled fluid or particulate slurry described herein may be dependent on the type of base fluid selected. When the base fluid selected is an aqueous base fluid, the gelling agent may be included in the gelled fluid (as well as the particulate slurry), as described above, in an amount in the range of from a lower limit of about 10 pounds per 1000 gallons (lb/Mgal), 12.5 lb/Mgal, 15 lb/Mgal, 17.5 lb/Mgal, 20 lb/Mgal, 22.5 lb/Mgal, 25 lb/Mgal, 27.5 lb/Mgal, 30 lb/Mgal, 32.5 lb/Mgal, 35 lb/Mgal, 37.5 lb/Mgal, and 40 lb/Mgal to an upper limit of about 80 lb/Mgal, 75.5 lb/Mgal, 75 lb/Mgal, 72.5 lb/Mgal, 70 lb/Mgal, 67.5 lb/Mgal, 65 lb/Mgal, 62.5 lb/Mgal, 60 lb/Mgal, 57.5 lb/Mgal, 55 lb/Mgal, 52.5 lb/Mgal, 50 lb/Mgal, 47.5 lb/Mgal, 45 lb/Mgal, 42.5 lb/Mgal, and 40 lb/Mgal, encompassing any value and subset therebetween. When the base fluid selected is an oil base fluid, the gelling agent may be included in the gelled fluid (as well as the particulate slurry), as described above, in an amount in the range of from a lower limit of about 3 gallons per 1000 gallons (gal/Mgal, 4 gal/Mgal, 5 gal/Mgal, 6 gal/Mgal, 7 gal/Mgal, 8 gal/Mgal, 9 gal/Mgal, and 10 gal/Mgal to an upper limit of about 20 gal/Mgal, 19 gal/Mgal, 18 gal/Mgal, 17 gal/Mgal, 16 gal/Mgal, 15 gal/Mgal, 14 gal/Mgal, 13 gal/Mgal, 12 gal/Mgal, 11 gal/Mgal, and 10 gal/Mgal of the base fluid, encompassing any value and subset therebetween. When the base fluid selected is a solvent base fluid, the gelling agent may be included in the gelled fluid (as well as the particulate slurry), as described above, in an amount in the range of from a lower limit of about 20 lb/Mgal, 25 lb/Mgal, 30 lb/Mgal, 35 lb/Mgal, 40 lb/Mgal, 45 lb/Mgal, 50 lb/Mgal, 55 lb/Mgal, and 60 lb/Mgal to an upper limit of about 100 lb/Mgal, 95 lb/Mgal, 90 lb/Mgal, 85 lb/Mgal, 80 lb/Mgal, 75 lb/Mgal, 70 lb/Mgal, 65 lb/Mgal, and 60 lb/Mgal by volume of the base fluid, encompassing any value and subset therebetween. When the base fluid selected is a viscoelastic base fluid, the gelling agent may be included in the gelled fluid (as well as the particulate slurry), as described above, in an amount in the range of from a lower limit of about 1%, 2%, 3%, 4%, 5%, 6%, 7%, and 8% to an upper limit of about 15%, 14%, 13%, 12%, 11%, 10%, 9%, and 8% by volume of the base fluid, encompassing any value and subset therebetween. When the base fluid selected is a hydrocolloid base fluid, the gelling agent may be included in the gelled fluid (as well as the particulate slurry), as described above, in an amount in the range of from a lower limit of about 0.5 lb/Mgal, 1 lb/Mgal, 10 lb/Mgal, 20 lb/Mgal, 30 lb/Mgal, 40 lb/Mgal, and 50 lb/Mgal to an upper limit of about 100 lb/Mgal, 90 lb/Mgal, 80 lb/Mgal, 70 lb/Mgal, 60 lb/Mgal, and 50 lb/Mgal of the base fluid, encompassing any value and subset therebetween.

The particulates for use in the methods described herein for introducing the treatment fluids comprising AA to a downhole location may include any particulates for use in a subterranean formation operation (e.g., proppant particulates, gravel particulates, and the like, and any combination thereof). In some instances, the particulates may be of a material capable of withstanding fracture closing pressures. In some embodiments, the particulates may be a natural or man-made material such as, for example, silica, alumina, fumed carbon, carbon black, graphite, mica, titanium dioxide, meta-silicate, calcium silicate, kaolin, talc, zirconia, boron, fly ash, crushed walnut, and the like, and any combination thereof.

The particulates may be of any size and shape combination suitable for the particular subterranean formation operation in which they are being used (e.g., a fracturing operation). Generally, where the chosen particulate is substantially spherical, suitable particulates may have an average particle size distribution in the range of from a lower limit of about 100 µm, 150 µm, 200 µm, 250 µm, 300 µm, 350 µm, 400 µm, 450 µm, 500 µm, 550 µm, 600 µm, 650 µm, 700 µm, and 750 µm to an upper limit of about 1200 µm, 1150 µm, 1100 µm, 1050 µm, 1000 µm, 950 µm, 900 µm, 850 µm, 800 µm, and 750 µm, encompassing any value and subset therebetween. In other embodiments, the average particle size distribution of the particulates may be greater than about 1250 µm, 1300 µm, 1350 µm, 1400 µm, 1450 µm, 1500 µm, or even larger, encompassing any value and subset therebetween. In some embodiments of the present disclosure, the particulates may have a size in the range of from about 2 to about 140 mesh, U.S. Sieve Series.

In some embodiments, it may be desirable to use substantially non-spherical particulates. Suitable substantially non-spherical particulates may be cubic, polygonal, fibrous, or any other non-spherical shape. Such substantially non-spherical particulates may be, for example, cubic-shaped, rectangular-shaped, rod-shaped, ellipse-shaped, cone-shaped, pyramid-shaped, cylinder-shaped, and the like, and any combination thereof. That is, in embodiments wherein the particulates are substantially non-spherical, the aspect ratio of the material may range such that the material is fibrous to such that it is cubic, octagonal, or any other configuration. Substantially non-spherical particulates are generally sized such that the longest axis is from about 0.02 inches ("in"), 0.03 in, 0.04 in, 0.05 in, 0.06 in, 0.07 in, 0.08 in, 0.09 in, 0.1 in, 0.11 in, 0.12 in, 0.13 in, 0.14 in, and 0.15 in to an upper limit of about 0.3 in, 0.29 in, 0.28 in, 0.27 in, 0.26 in, 0.25 in, 0.24 in, 0.23 in, 0.22 in, 0.21 in, 0.2 in, 0.19 in, 0.18 in, 1.17 in, 0.16 in, and 0.15 in length, encompassing any value and subset therebetween. In other embodiments, the longest axis is from about 0.05 inches to about 0.2 inches in length. In one embodiment, the substantially non-spherical particulates may be cylindrical and have an aspect ratio of about 1.5 to about 1, and about 0.08 inches in diameter and about 0.12 inches in length. In another embodiment, the substantially non-spherical particulates may be cubic having sides of about 0.08 inches in length. The use of substantially non-spherical particulates may be desirable in some embodiments because, among other things, they may provide a lower rate of settling when slurried into a fluid, or may be better suited for placement in preexisting and/or new fractures in a subterranean formation.

In some embodiments, the particulates may be present in the gelled fluid (as well as the particulate slurry) described herein in an amount in the range of a lower limit of about 18%, 20%, 22%, 24%, 26%, 28%, 30%, 32%, 34%, 36%, 38%, 40%, and 42% to an upper limit of about 65%, 62%, 60%, 58%, 56%, 54%, 52%, 50%, 48%, 46%, 44%, and 42%, encompassing any value and subset therebetween.

The AA may be added to the gelled fluid or the particulate slurry described herein to form the particulate-containing treatment fluid comprising AA and to dilute the gelled fluid or the particulate slurry (also gelled) to an appropriate amount for use in a particular subterranean formation operation. In some embodiments, the AA may be introduced into the gelled fluid or the particulate slurry to form the particulate-containing treatment fluid having a final particulate concentration in the range of a lower limit of about 0.1%, 0.5%, 1%, 2%, 4%, 6%, 8%, 10%, 12%, 14%, 16%, 18%, 20%, 22%, and 24% to an upper limit of about 48%, 46%, 44%, 42%, 40%, 38%, 36%, 34%, 32%, 30%, 28%, 26%, and 24% by volume of the particulate-containing treatment fluid, encompassing any value and subset therebetween.

It is to be recognized that the disclosed fluids described herein (those comprising AA) may also directly or indirectly affect various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: preparing a treatment fluid comprising a bulk amount of anhydrous ammonia, wherein the anhydrous ammonia is present in an amount greater than about 10% by weight of a liquid portion of the treatment fluid, and wherein the anhydrous ammonia is in a phase selected from the group consisting of a liquid phase, a gaseous phase, supercritical phase, and any combination thereof; and introducing the treatment fluid into a subterranean formation.

Embodiment A may have one or more of the following additional elements in any combination:

Element A1: Wherein the anhydrous ammonia is in the liquid phase or the supercritical phase, and wherein the treatment fluid further comprises a gelling agent, thereby forming gelled anhydrous ammonia treatment fluid.

Element A2: Wherein the anhydrous ammonia is in the liquid phase or the supercritical phase, and wherein the treatment fluid further comprises a gelling agent, thereby forming gelled anhydrous ammonia treatment fluid, and wherein the gelling agent is a colloidal clay.

Element A3: Further comprising introducing the treatment fluid into the subterranean formation at a rate and pressure sufficient to create or enhance at least one fracture therein.

Element A4: Further comprising performing a subterranean formation operation selected from the group consisting of a drilling operation, a stimulation operation, an acidizing operation, an acid-fracturing operation, a sand control operation, a fracturing operation, a frac-packing operation, a gravel-packing operation, a production operation, a remedial operation, a gas hydrate removal operation, an enhanced oil recovery operation, an injection operation, a pipeline operation, a remedial operation, a formation damage reduction operation, a cementing operation, and any combination thereof.

Element A5: Wherein the subterranean formation has a temperature greater than 132.4° C. and pressure greater than 112.8 bar, such that the anhydrous ammonia is a supercritical fluid in the subterranean formation.

Element A6: Wherein the subterranean formation comprises a carbonate selected from the group consisting of an alkali carbonate, an alkai-earth carbonate, a transition metal carbonate, and any combination thereof, and further comprising at least partially solubilizing the carbonate with the anhydrous ammonia.

Element A7: Wherein the subterranean formation comprises a heavy aromatic compound, and further comprising at least partially ammonolyzing the heavy aromatic compound with the anhydrous ammonia, thereby forming at least one wormhole in the subterranean formation.

Element A8: Wherein the subterranean formation comprises connate water, and further comprising contacting the anhydrous ammonia with the connate water to increase a temperature of the subterranean formation.

Element A9: Further comprising etching microfractures in the subterranean formation with the anhydrous ammonia.

Element A10: Further comprising recovering at least a portion of the treatment fluid from the subterranean formation, and recycling the anhydrous ammonia recovered from the subterranean formation.

Element A11: Further comprising at least partially inhibiting formation of a gas hydrate in the subterranean formation.

Element A12: Further comprising a tubular extending into a wellbore in the subterranean formation, and a pump fluidly coupled to the tubular, wherein the step of introducing the treatment fluid into the subterranean formation comprises introducing the treatment fluid through the tubular.

By way of non-limiting example, exemplary combinations applicable to A include: A with A1, A4, and A5; A with A2, A6, A8, and A12; A with A1, A2, A3, A4, A5, A6, A7, A8, A9, A10, A11, and A12; A with A3, A7, and A10; A with A0, A11, and A12, and the like.

Embodiment B: A method comprising: pre-treating a pipeline conduit with a treatment fluid, the treatment fluid comprising a bulk amount of anhydrous ammonia, wherein the anhydrous ammonia is present in an amount greater than about 10% by weight of a liquid portion of the treatment fluid, and wherein the anhydrous ammonia in a phase selected from the group consisting of a liquid phase, a gaseous phase, supercritical phase, and any combination thereof; and flowing a hydrocarbon through the pre-treated pipeline conduit.

Embodiment B may have one or more of the following additional elements in any combination:

Element B1: Wherein the anhydrous ammonia is a supercritical fluid.

Element B2: Further comprising at least partially inhibiting the formation of a gas hydrate by pre-treating the pipeline conduit with the treatment fluid.

Element B3: Wherein the anhydrous ammonia is in the liquid phase or the supercritical phase, and wherein the treatment fluid further comprises a gelling agent, thereby forming gelled anhydrous ammonia treatment fluid.

Element B4: Wherein the anhydrous ammonia is in the liquid phase or the supercritical phase, and wherein the treatment fluid further comprises a gelling agent, thereby forming gelled anhydrous ammonia treatment fluid, and wherein the gelling agent is a colloidal clay.

By way of non-limiting example, exemplary combinations applicable to B include: B with B1 and B2; B with B1 and B3; B with B1 and B4; B with B2 and B3; B with B2 and B4; B with B3 and B4; B with B1, B2, and B3; B with B1, B3, and B4; B with B2, B3, and B4; B with B1, B2, B3, and B4; and the like.

Embodiment C: A treatment fluid comprising: anhydrous ammonia, wherein the anhydrous ammonia is present in an amount greater than about 10% by weight of a liquid portion of the treatment fluid, and wherein the anhydrous ammonia in a phase selected from the group consisting of a liquid phase, a gaseous phase, and any combination thereof; and an oilfield additive selected from the group consisting of a gelling agent, a salt, a weighting agent, an inert solid, a fluid loss control agent, an emulsifier, a dispersion aid, a corrosion inhibitor, an emulsion thinner, an emulsion thickener, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, a defoaming agent, and any combination thereof.

Embodiment C may have one or more of the following additional elements in any combination:

Element C1: Wherein the anhydrous ammonia is in the liquid phase or the supercritical phase, and wherein the gelling agent is a colloidal clay, thereby forming gelled anhydrous ammonia treatment fluid.

Element C2: Wherein the anhydrous ammonia is a supercritical fluid.

Element C3: Wherein the treatment fluid further comprises a base fluid selected from the group consisting of an aqueous base fluid, an oil base fluid, a solvent base fluid, a viscoelastic base fluid, a hydrocolloid base fluid, and any combination thereof.

By way of non-limiting example, exemplary combinations applicable to C include: C with C1 and C2; C with C1 and C3; C with C2 and C3; C with C1, C2, and C3; and the like.

Embodiment D: A method comprising: preparing a gelled fluid comprising a base fluid, a first gelling agent, and particulates; introducing the gelled fluid into a process stream, the process stream in fluid communication with a subterranean formation; introducing anhydrous ammonia into the gelled fluid at a downstream location in the process stream, thereby forming a particulate-containing treatment fluid; and introducing the particulate-containing treatment fluid into the subterranean formation from the process stream and through the wellhead.

Embodiment D may have one or more of the following additional elements in any combination:

Element D1: Wherein the base fluid is selected from the group consisting of an aqueous base fluid, an oil base fluid, a solvent base fluid, a viscoelastic base fluid, a hydrocolloid base fluid, and any combination thereof.

Element D2: Wherein the particulates are present in the gelled fluid in an amount in the range of from about 18% by volume of the gelled fluid to about 65% by volume of the gelled fluid.

Element D3: Wherein the anhydrous ammonia is introduced into the gelled fluid in an amount to achieve a final particulate concentration in the particulate-containing treatment fluid in an amount in the range of from about 0.1% to about 48% by volume of the particulate-containing treatment fluid.

Element D4: Wherein the anhydrous ammonia is in a phase selected from the group consisting of a liquid phase, a gaseous phase, and any combination thereof.

Element D5: Wherein the process stream further comprises a pump in fluid communication therewith at an upstream location from the subterranean formation, and the downstream location in the process stream for introducing the anhydrous ammonia is upstream of the pump.

Element D6: Wherein the process stream further comprises a pump in fluid communication therewith at an upstream location from the subterranean formation, and the downstream location in the process stream for introducing the anhydrous ammonia is upstream of the pump, and wherein the pump is a high pressure pump.

Element D7: Wherein a fluid selected from the group consisting of the gelled fluid, the particulate-containing treatment fluid, and any combination thereof further comprises an oilfield additive selected from the group consisting of a second gelling agent, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

Element D8: Wherein a fluid selected from the group consisting of the gelled fluid, the particulate-containing treatment fluid, and any combination thereof further comprises an oilfield additive added thereto by introducing the oilfield additive into the process stream, the oilfield additive selected from the group consisting of a second gelling agent, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

By way of non-limiting example, exemplary combinations applicable to D include: D with D1, D2, and D8; D with D3, D5, D6, and D8; D with D with D4 and D7; D with D3 and D8; D with D1, D3, D4, and D8; and the like.

Embodiment E: A method comprising: preparing a gelled fluid comprising a first base fluid and a first gelling agent; introducing the gelled fluid into a process stream, the process stream in fluid communication with a subterranean formation; introducing particulates into the gelled fluid at a first downstream location in the process stream, thereby forming a particulate slurry; introducing anhydrous ammonia into the particulate slurry at a second downstream location in the process stream, thereby forming a particulate-containing treatment fluid, wherein the second downstream location is downstream of the first downstream location; and introducing the particulate-containing treatment fluid into the subterranean formation from the process stream.

Embodiment E may have one or more of the following additional elements in any combination:

Element E1: Wherein the base fluid is selected from the group consisting of an aqueous base fluid, an oil base fluid, a solvent base fluid, a viscoelastic base fluid, a hydrocolloid base fluid, and any combination thereof.

Element E2: Wherein the step of introducing the particulates into the gelled fluid at the first downstream location in the process stream, and the step of introducing the anhydrous ammonia into the particulate slurry at a second downstream location in the process stream, are performed either sequentially in time or simultaneously in time.

Element E3: Wherein the particulates are introduced into the gelled fluid in an amount in the range of from about 18% by volume of the gelled fluid to about 65% by volume of the gelled fluid.

Element E4: Wherein the particulates are introduced into the gelled fluid in a gelled particulate slurry comprising a second base fluid and a second gelling agent.

Element E5: Wherein the anhydrous ammonia is introduced into the particulate slurry in an amount to achieve a final particulate concentration in the particulate-containing treatment fluid in an amount in the range of from about 0.1% to about 48% by volume of the particulate-containing treatment fluid.

Element E6: Wherein the anhydrous ammonia is in a phase selected from the group consisting of a liquid phase, a gaseous phase, and any combination thereof.

Element E7: Wherein the process stream further comprises a pump in fluid communication therewith at an upstream location from the subterranean formation, and the second downstream location in the process stream for introducing the anhydrous ammonia is upstream of the pump.

Element E8: Wherein the process stream further comprises a pump in fluid communication therewith at an upstream location from the subterranean formation, and the second downstream location in the process stream for introducing the anhydrous ammonia is upstream of the pump, and wherein the pump is a high pressure pump.

Element E9: Wherein a fluid selected from the group consisting of the gelled fluid, the particulate slurry, the particulate-containing treatment fluid, and any combination thereof further comprises an oilfield additive selected from the group consisting of a second gelling agent, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

Element E10: Wherein a fluid selected from the group consisting of the gelled fluid, the particulate slurry, the particulate-containing treatment fluid, and any combination thereof further comprises an oilfield additive added thereto by introducing the oilfield additive into the process stream, the oilfield additive selected from the group consisting of a second gelling agent, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

By way of non-limiting example, exemplary combinations applicable to E include: E with E1, E4, and E10; E with E2, E5, E6, and E9; E with E3, E8, and E10; E with E1, E2, E3, and E4; E with E5, E8, and E9; E with E7 and E10; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   preparing a gelled fluid comprising a base fluid, a first gelling agent, and particulates, the base fluid includes a viscoelastic base fluid, a hydrocolloid base fluid, or any combination thereof;
   introducing the gelled fluid into a process stream, the process stream in fluid communication with a wellhead, wherein the wellhead is in fluid communication with a subterranean formation;
   introducing anhydrous ammonia into the gelled fluid at a downstream location in the process stream prior to the wellhead, thereby forming a particulate-containing treatment fluid; and
   introducing the particulate-containing treatment fluid into the subterranean formation from the process stream and through the wellhead.

2. The method of claim 1, wherein the base fluid is further selected from the group consisting of an aqueous base fluid, an oil base fluid, a solvent base fluid, and any combination thereof.

3. The method of claim 1, wherein in the step of preparing a gelled fluid, the particulates are present in the gelled fluid in an amount in the range of from about 18% by volume of the gelled fluid to about 65% by volume of the gelled fluid.

4. The method of claim 1, wherein the anhydrous ammonia is introduced into the gelled fluid in an amount to achieve a final particulate concentration in the particulate-containing treatment fluid in an amount in the range of from about 0.1% to about 48% by volume of the particulate-containing treatment fluid.

5. The method of claim 1, wherein the anhydrous ammonia is in a phase selected from the group consisting of a liquid phase, a gaseous phase, and any combination thereof.

6. The method of claim 1, wherein the process stream further comprises a pump in fluid communication therewith at an upstream location from the subterranean formation, and the downstream location in the process stream for introducing the anhydrous ammonia is upstream of the pump.

7. The method of claim 6, wherein the pump is a high pressure pump.

8. The method of claim 1, wherein the gelled fluid or the particulate-containing treatment fluid further comprises an oilfield additive selected from the group consisting of a second gelling agent, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

9. The method of claim 1, wherein the gelled fluid or the particulate-containing treatment fluid further comprises an oilfield additive added thereto by introducing the oilfield additive into the process stream, the oilfield additive selected from the group consisting of a second gelling agent, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

* * * * *